R. FRICK.
OILER.
APPLICATION FILED JAN. 3, 1921.
1,394,991.
Patented Oct. 25, 1921.
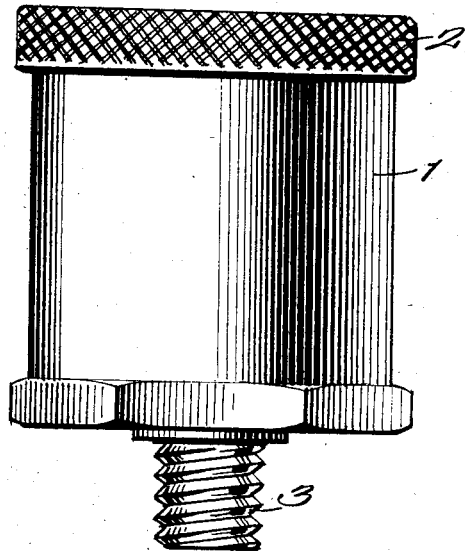
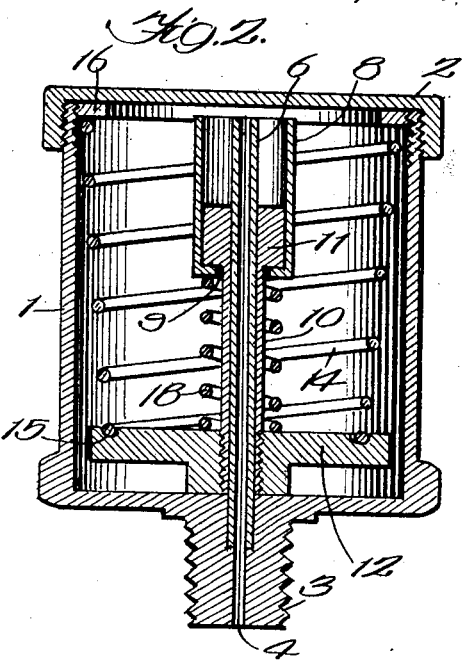
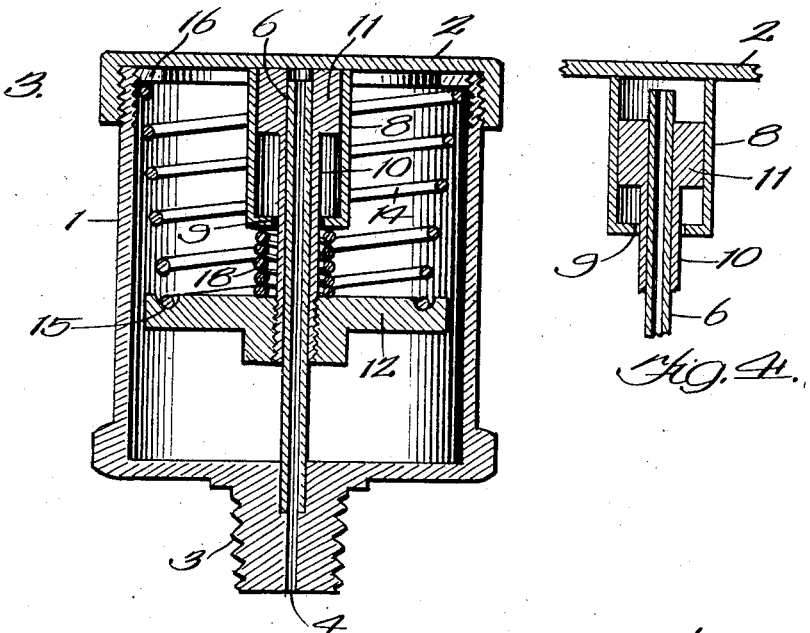
Inventor:
Robert Frick
By Cheever & Cox
Attys.

UNITED STATES PATENT OFFICE.

ROBERT FRICK, OF CHICAGO, ILLINOIS.

OILER.

1,394,991.     Specification of Letters Patent.     Patented Oct. 25, 1921.

Application filed January 3, 1921. Serial No. 434,600.

*To all whom it may concern:*

Be it known that I, ROBERT FRICK, a citizen of the United States, residing at Chicago, in the county of Cook and State of Illinois, have invented a certain new and useful Improvement in Oilers, of which the following is a specification.

My invention relates to oilers, and the purpose is to produce a device operated by variations in centrifugal force for oiling the bearings of objects rotating at variable speed, as for example the wheels of motor vehicles.

In my copending application filed March 29, 1920, Serial No. 369,645, I have shown an oiler adapted to be mounted upright, in fixed position on a bearing subjected, in practice, to an appreciable amount of vibration, as in a motor vehicle. My present device is adapted to be mounted on the hub of a motor vehicle wheel, or similar object, expected, in practice, to rotate at variable speed.

I obtain my object by the mechanism illustrated in the accompanying drawings in which—

Figure 1 is a side elevation of the device,

Fig. 2 is an axial section thereof,

Fig. 3 is an axial section with the moving parts in changed position, and

Fig. 4 is a sectional detail showing the moving parts in still a different position.

Like numerals denote like parts throughout the several views.

In the form selected to illustrate the invention there is a reservoir 1 having a head or cap 2 screwing on to it to form a closure for it. At the lower end of the reservoir there is an externally threaded nipple 3 having a discharge passage 4 for delivering oil to the bearings. It is intended that in practice this nipple shall be screwed into the hub of the wheel or pulley whose journal is to be lubricated, the parts to be assembled in such manner that when oil flows downward or inward toward the axis of rotation, oil will be delivered direct to the bearing. Of course, when the device is fastened to the hub of a rotating wheel, its top will be uppermost at one moment and lowermost at another moment, but for convenience the outer end, away from the axis of rotation, may be referred to as the "top" and the opposite end as the "bottom", thus conforming to the position shown in the drawings.

Extending upward from the bottom of the reservoir, and communicating with the discharge passage 4 is a discharge tube 6 which terminates a short distance away from the inside surface of the reservoir head 2. This tube is rigidly fastened and hence always maintains this position in the device. Surrounding the tube at its upper end is a cylinder 8, having its upper end open, but adapted to be closed by moving into contact with the head of the reservoir. In the design illustrated this cylinder is in the form of a thimble having an opening 9 surrounding a sleeve 10 and spaced from its sufficiently to permit the free flow of oil. This sleeve forms the stem of a plunger 11 which makes a sliding fit within the cylinder. The sleeve is externally threaded at its lower end to screw into a weight 12 which normally seats upon the bottom of the reservoir as shown in Fig. 2. This weight is preferably circular and concentric with the sleeve and its diameter is appreciably less than the internal diameter of the reservoir, the purpose being to permit a free flow of oil past the edges of the weight. As the weight is rigidly fastened to the lower or inner end of sleeve 10, and the sleeve is rigidly fastened to or an integral part of plunger 11 it follows, of course, that the movements of the weight will produce corresponding movements of the plunger. The parts are so proportioned that when the weight is seated upon the bottom of the reservoir as shown in Fig. 2, the plunger will engage the lower end of the thimble-like cylinder 8 and will hold the open end of said cylinder a slight distance away from the head of the reservoir so that oil may flow from the reservoir to the inside of the cylinder.

A helical spring 14 rests at one end in an annular groove 15 in the top of the weight 12 and at the other end rests against an adjusting ring 16 which is externally threaded to work in the internally threaded upper end of the reservoir. By screwing this ring up or down the compression in the spring may be regulated. The spring is quite light so that the weight and connected parts may move freely under the effects of centrifugal action.

A second helical spring 18 is interposed between the weight and the cylinder. Its length is such that when the weight is seated the cylinder is out of contact with the head of the reservoir, but as soon as the weight moves toward the head of the reservoir the cylinder will move along with it. Thus, the cylinder and the plunger 11 will move in unison toward the head of the reservoir at the beginning of the upward movement of the parts and after the cylinder has engaged the top of the reservoir, the cylinder will be closed and the rising plunger will force oil from the cylinder into the delivery tube 6.

Operation: Let it be assumed that the vehicle wheel or pulley or other object to be lubricated is standing still and that the oiler is standing upright. Let it also be assumed that the reservoir is partially filled with oil. Under these conditions the parts will assume the positions shown in Fig. 2 and the oil will rest upon the lower or inner end of the reservoir. As tube 6 rises above the level of the oil, the latter cannot flow to the bearing. Now let it be assumed that the wheel starts to revolve. As the oiler swings downward the oil will flow toward the reservoir head but under the influence of gravity, the weight, cylinder and plunger will also move toward the reservoir head and hence close the cylinder. Furthermore, as the tube 6 now extends downward from the bearing, the weight of the oil will prevent it from flowing up through said tube to the bearing. Thus it will be seen that no matter in what position the wheel and oiler may come to rest, there will be no tendency for oil to flow direct to the bearing. Hence, there is no tendency to flood the bearing and waste the oil. Now, let it be assumed that the wheel begins to revolve at a rapid rate. Centrifugal action, beginning to take effect, will first cause the weight, cylinder and plunger to move in unison toward the head 2 of the reservoir. As soon as the cylinder has come into contact with the reservoir head, it becomes closed. If, now, the rate of rotation continues to increase, centrifugal action acting upon the weight and plunger, will compress the springs 14, 18 and the plunger will move toward the reservoir head 2 thus causing oil to be forced out through the delivery passage 6 and discharge passage 4 to the bearing. The limit of this movement of the parts is illustrated in Fig. 3, but in Fig. 4 the plunger is shown in an intermediate position. Vehicle wheels ordinarily vary their speed of rotation and this, of course, varies the centrifugal force acting upon the weight and plunger. The result is that in practice the plunger will float or dance within the cylinder, moving outward as the speed of rotation increases, and moving inward as it decreases. Consequently, there is a pumping action and when the speed decreases below a predetermined minimum the spring 14 moves the weight into contact with the inner end of the reservoir and thus causes the plunger to retract the cylinder sufficiently to permit a fresh charge of oil to enter it.

It will thus be seen that my oiler effectually prevents oil from reaching the bearing when the vehicle or pulley is standing still but causes oil to be pumped to the bearing as the result of fluctuations in speed of rotation, and hence in the intensity of the centrifugal force acting upon the moving parts.

Having thus described my invention, what I claim as new and desire to secure by Letters Patent, is:

1. In an oiler for the bearings of variable speed objects, a reservoir having a head at the outer end, a discharge tube having an inlet slightly spaced from the head of the reservoir, a movable, open ended cylinder within the reservoir adapted to engage the head of the reservoir, for closing the open end of the cylinder, the inlet of the tube being within the cylinder, a plunger slidable within the cylinder for pumping oil into the tube when the cylinder is in contact with the head of the reservoir, and means subject to centrifugal action for moving the cylinder into contact with the reservoir head and reciprocating the plunger within the cylinder.

2. A centrifugal oiler having a reservoir provided with a head at the outer end, a discharge tube having an inlet slightly spaced from the head of the reservoir, a movable, open ended cylinder within the reservoir, adapted to engage the head of the reservoir for closing the open end of the cylinder, the inlet of the tube being within the cylinder, a plunger slidable within the cylinder for pumping oil into the tube when the cylinder is in contact with the head of the reservoir, a spring balanced weight adapted under variable centrifugal action to reciprocate the plunger in the cylinder, and a spring actuated by said weight for moving the cylinder into contact with the head of the reservoir.

3. An oiler having a reservoir provided with a closed head at its outer end, a fixed tube leading from near the reservoir head to the opposite end of the reservoir for delivering oil therefrom, a thimble-like cylinder in the reservoir having an open end adapted to engage the reservoir head, a weight within the reservoir, a plunger within the cylinder, a sleeve surrounding the tube and rigidly connecting the weight to the plunger, said plunger being adapted to retract the cylinder from the reservoir head and a spring interposed between the weight and the reservoir head for urging the plunger away from the reservoir head, said spring being adapted to yield under centrifugal action exerted on the weight.

4. A centrifugal oiler having a reservoir adapted to be secured to the hub of the body to be lubricated, the reservoir having a head for closing the outer end, a tube terminating at a slight distance from the head of the reservoir and leading to the opposite end thereof for discharging into the bearing, a sleeve slidable upon said tube, plunger at one end of said sleeve and a weight at the other end, a cylinder surrounding said plunger and having an open end adapted to engage the head of the reservoir, the plunger being adapted to engage the inner end of the cylinder for retracting it from the reservoir head, and springs interposed between the weight and the reservoir head and between the weight and the cylinder.

5. A centrifugal oiler having a reservoir adapted to be secured to the hub of the body to be lubricated, the reservoir having a head for closing the outer end, a tube terminating at a slight distance from the head of the reservoir and leading to the opposite end thereof for discharging into the bearing, a sleeve slidable upon said tube, plunger at one end of said sleeve, and a weight at the other end, a cylinder surrounding said plunger and having an open end adapted to engage the head of the reservoir, the plunger being adapted to engage the inner end of the cylinder for retracting it from the reservoir head, a threaded ring screwing into said reservoir and a spring interposed between said ring and the weight for urging the latter away from the head of the reservoir.

In witness whereof, I have hereunto subscribed my name.

ROBERT FRICK.